(12) United States Patent
Jadhav et al.

(10) Patent No.: US 11,652,920 B2
(45) Date of Patent: May 16, 2023

(54) METHODS AND SYSTEMS FOR DIFFERENT MID-CALL ANNOUNCEMENTS TO BOTH SERVED AND NON-SERVED PARTIES AT THE SAME TIME

(71) Applicant: TELEFONAKTIEBOLAGET LM ERICSSON (PUBL), Stockholm (SE)

(72) Inventors: Kiran Jadhav, Karlskrona (SE); Ove Karlsson, Emmaboda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/297,162

(22) PCT Filed: Dec. 17, 2018

(86) PCT No.: PCT/EP2018/085314
§ 371 (c)(1),
(2) Date: May 26, 2021

(87) PCT Pub. No.: WO2020/125934
PCT Pub. Date: Jun. 25, 2020

(65) Prior Publication Data
US 2022/0030107 A1    Jan. 27, 2022

(51) Int. Cl.
*H04L 65/1063* (2022.01)
*H04M 15/00* (2006.01)
*H04M 3/487* (2006.01)

(52) U.S. Cl.
CPC ........ *H04M 3/487* (2013.01); *H04L 65/1063* (2013.01); *H04M 15/842* (2013.01)

(58) Field of Classification Search
CPC ........................... H04M 3/487; H04L 65/1063
See application file for complete search history.

(56) References Cited

U.S. PATENT DOCUMENTS

| 6,614,781 | B1 * | 9/2003 | Elliott | H04L 65/765 |
| | | | | 370/352 |
| 6,917,671 | B1 * | 7/2005 | Burg | H04M 15/8351 |
| | | | | 379/121.02 |

(Continued)

FOREIGN PATENT DOCUMENTS

| EP | 0917337 A1 | 5/1999 |
| WO | 2012104228 A1 | 8/2012 |

OTHER PUBLICATIONS

3GPP TS 32.281 version 13.0.0, Release 13, "Universal Mobile Telecommunications System (UMTS); LTE Telecommunication management; Charging management; Announcement service," Jan. 2016, pp. 1-29.

(Continued)

*Primary Examiner* — Aftab N. Khan
(74) *Attorney, Agent, or Firm* — Patent Portfolio Builders, PLLC (57) ABSTRACT

Systems and methods are provided for generating announcement information at a communication node. The method includes: generating a first announcement information associated with a first user; generating a second announcement information associated with a second user; and transmitting the first and second announcement information to a telephony application server, wherein the first announcement information and the second announcement information include at least one different element of data, further wherein both the first and second announcement information are used to generate or select announcements which are transmitted to the first and second users during a call between the first and second users.

12 Claims, 10 Drawing Sheets

(56) References Cited

U.S. PATENT DOCUMENTS

| | | | | |
|---|---|---|---|---|
| 7,796,603 B1* | 9/2010 | Bertone | ............... | H04L 65/1069 |
| | | | | 370/395.2 |
| 2005/0223408 A1* | 10/2005 | Langseth | .............. | H04M 3/493 |
| | | | | 725/86 |
| 2006/0075132 A1* | 4/2006 | Liu | ..................... | H04L 65/1101 |
| | | | | 709/236 |
| 2008/0101584 A1* | 5/2008 | Gray | ................. | H04M 3/53391 |
| | | | | 379/221.08 |
| 2013/0315230 A1* | 11/2013 | Li | ........................ | H04M 7/006 |
| | | | | 370/352 |
| 2018/0295234 A1* | 10/2018 | Kumar Selvaraj | ......................... | |
| | | | | H04L 65/1059 |

OTHER PUBLICATIONS

3GPP TS 32.299 version 12.6.0, Release 12, "Digital cellular telecommunications system (Phase 2+); Universal Mobile Telecommunications System (UMTS); LTE Telecommunication management; Charging management; Diameter charging applications," Oct. 2014, pp. 1-166.

International Search Report / Written Opinion dated May 22, 2019 in related/corresponding PCT Application No. PCT/EP2018/085314.

Examination Report in corresponding/related Indian Application No. 202147031400 dated Mar. 14, 2022.

Examination Report in related/corresponding EP Application No. 18 826 283.6 dated Sep. 2, 2022.

* cited by examiner

METHODS AND SYSTEMS FOR DIFFERENT MID-CALL ANNOUNCEMENTS TO BOTH SERVED AND NON-SERVED PARTIES AT THE SAME TIME

TECHNICAL FIELD

The present invention generally relates to communication networks and, more particularly, to mechanisms and techniques for playing announcements during calls.

BACKGROUND

Over time the number of products and services provided to users of telecommunication products has grown significantly. For example, in the early years of wireless communication, devices could be used for conversations and later also had the ability to send and receive text messages. Over time, technology advanced and wireless phones of varying capabilities were introduced which had access to various services provided by network operators, e.g., data services, such as streaming video or music service. More recently there are numerous devices, e.g., so called "smart" phones and tablets, which can access communication networks in which the operators of the networks, and other parties, provide many different types of services, applications, etc. Accordingly, there needs to be methods and systems for operators to communicate with users for various reasons when using services, such as, voice and video calls.

An example of how telecommunication services and products are provided to such devices will now be described with respect to a Charging and Billing system also known as an Online Charging System (OCS), which may be a part of an operators Business Support System (BSS). In the OCS, the services that a customer can use, e.g., calling another party or utilizing mobile data, is modelled as a service.

For any end user, there is a representation of the products and services within the OCS which can be in the form of an account that captures mapping of the assigned offerings with the actual resources that are allocated to an end user or subscriber. In order to manage usage of services and to charge the customer based on the usage, an operator typically hosts an OCS in its network. This node (or set of nodes) is responsible for determining the requested usage, looking at the state of the account and making a determination of how much usage to grant to the user.

Figure 1:
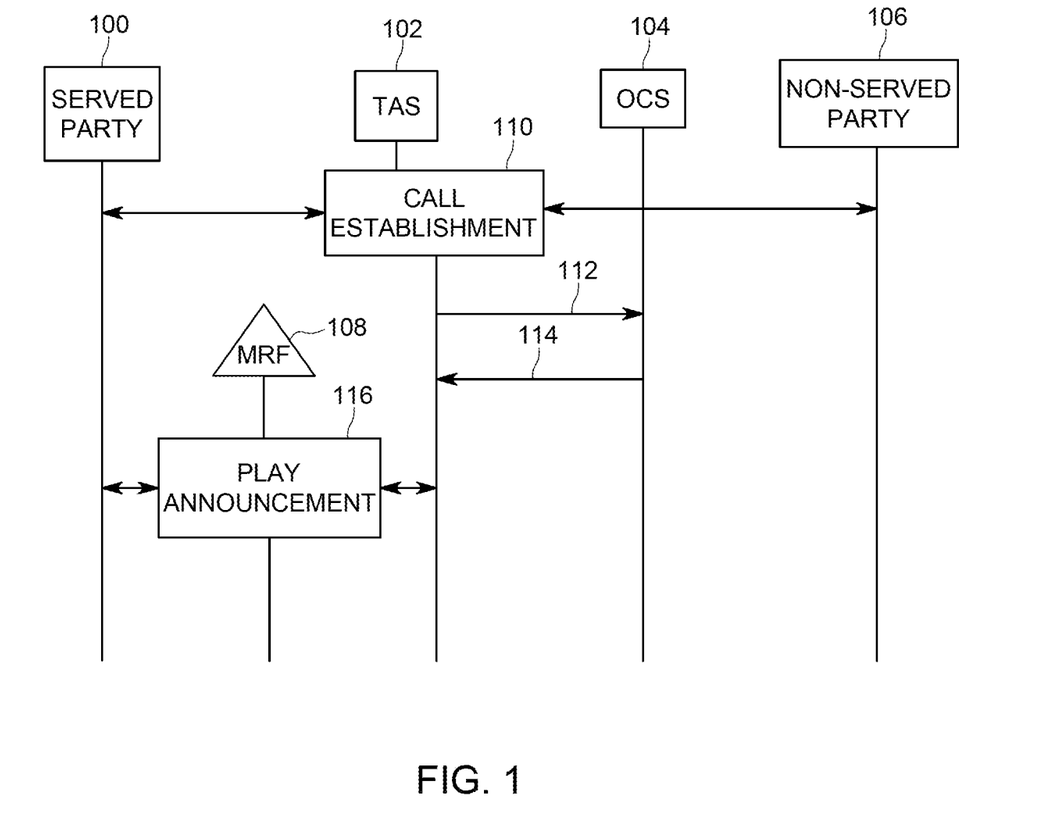
FIG. 1 illustrates a mid-call announcement signaling diagram.

Currently, there are procedures for session charging with unit reservation, as shown for example in $3^{rd}$ generation partnership project (3GPP) technical specification (TS) 32.299 v 15.0.0. For example, in order to perform a Reserve Units operation for a number of units, which can be monetary or non-monetary units, a network element sends a credit control request (CCR) message to the OCS. If the cost of the service is included in the request, the OCS directly reserves the specified monetary amount and if the credit balance is sufficient, the OCS reserves the corresponding amount from the user's account. Once the reservation has been made, the OCS returns a credit control answer (CCA) message to the network element in order to authorize the service execution It is possible for a user's account to have insufficient funds when using a service, e.g., a user-initiated voice or video call, and there is currently a mid-call announcement method which addresses this situation, an example of which is briefly described below with respect to FIG. 1. FIG. 1 illustrates a mid-call announcement generated during a session, which can be a voice or video call, between two users. FIG. 1 includes the served party 100, which is also the session initiator, the telephony application server (TAS) 102, the OCS 104, the non-served party 106 and a media resource function (MRF) 108.

Initially, a call is established from the served party 100 to the non-served party 106 via the TAS 102 as shown in call establishment 110. At some point in time during the call, a charging trigger is encountered in which the TAS 102 transmits a message 112 to the OCS 104 requesting service units. The OCS 104 performs some form of credit check for the served party's account. If the OCS 104 determines that the served party's account has insufficient funds to cover the requested service unites, then the OCS 104 transmits a response message 114 back to the TAS 102 which indicates that an announcement should be played to the served party 100. The TAS 102 then instructs the MRF 108 to transmit the announcement to the served party 100 as shown in play announcement 116. The announcement can, for example, inform the served party 100 that she or he needs to deposit more funds to her or his account. For more information on current mid-call announcement methods, 3GPP TS 32.281 v 15.0.0 shows a message sequence chart for mid-call announcement during an Internet Multimedia Subsystem (IMS) session.

As mentioned above, with respect to the example shown in FIG. 1, the OCS 104 instructs the TAS 102 that an announcement should be played to the served party 100. The format of that announcement information currently comes in the form of an Announcement-Information Attribute Value Pair (AVP) which is a Grouped type AVP and includes the announcement service parameters. Each AVP includes a single announcement to be played to the specified user. An illustration of the current Announcement-Information AVP is shown below.

---

Announcement-Information::= <AVP Header: 3904>
    {Announcement-Identifier}
    *[Variable-Part]
    [Time-Indicator]
    [Quota-Indicator]
    [Announcement-Order]
    [Play-Alternative]
    [Privacy-Indicator]
    [Language]

---

For more information regarding the currently used Announcement-Information AVP see 3GPP TS 32.299 v13.5.0.

One limitation of the current system is that announcement support for mid-call announcements in an ongoing Voice over Long Term Evolution (VoLTE) or Video over LTE (ViLTE) calls can only support two options. Option 1 is to play an announcement only to the served party 100 or only to the non-served party 106 and Option 2 is to play the same announcement to both the served party 100 and the non-served party 106.

If the announcement is to be played to only one party, the other party is put on hold with no information about what is going on at the other end of the call. This creates a poor end-user experience for the party that is put on hold, as that party does not know whether the call dropped or if the other party went silent. When the announcement is played to both parties at the same time, it is the same announcement that is played to both of the parties. This can create confusion as the announcement information is primarily meant for either the served party 100 or the non-served party 106, but not for both parties. For example, if the announcement is informing the served party 100 that their account needs credits, having the non-served party 106 hear that announcement does not add value to the non-served party 106 and could possibly aggravate the served party 100 by sharing personal information with the non-served party 106.

Thus, there is a need to provide methods and systems that overcome the above-described drawbacks associated with mid-call announcements.

SUMMARY

Embodiments allow for playing different mid-call announcements for the served party and the non-served party at the same time, whenever a mid-call announcement is triggered for either party during, for example, an ongoing Voice over Long Term Evolution (VoLTE) or Video over LTE (ViLTE). This can improve the end-user experience by giving the possibility to play different announcements that are relevant to each party.

According to an embodiment, there is a method for generating announcement information at a communication node. The method comprises: generating a first announcement information associated with a first user; generating a second announcement information associated with a second user; and transmitting the first and second announcement information to a telephony application server, wherein the first announcement information and the second announcement information include at least one different element of data, further wherein both the first and second announcement information are used to generate or select announcements which are transmitted to the first and second users during a call between the first and second users.

According to an embodiment, there is a communication node for generating announcement information. The communication node comprising: a processor configured to generate a first announcement information associated with a first user; the processor configured to generate a second announcement information associated with a second user; and a communication interface configured to transmit the first and second announcement information to a telephony application server, wherein the first announcement information and the second announcement information include at least one different element of data, further wherein both the first and second announcement information are used to generate or select announcements which are transmitted to the first and second users during a call between the first and second users.

According to an embodiment, there is a method for controlling announcements to both a first user and a second user during a call between the first user and the second user, wherein the controlling is performed by a communication node. The method comprising: receiving instructions associated with transmitting a first announcement to a first user and a second announcement to a second user during a call between the first user and the second user, wherein the first announcement and the second announcement are different; instructing at least one node to transmit the first announcement to the first user and to transmit the second announcement to the second user, wherein the first announcement and the second announcement are played at a same time; monitoring the transmission of the first announcement and the transmission of the second announcement, wherein one of the two announcements is a priority announcement and the other of the two announcements is a non-priority announcement; and instructing the at least one node to stop transmission of the non-priority announcement when the priority announcement is finished.

According to an embodiment, there is a communication node configured to control announcements to both a first user and a second user during a call between the first user and the second user. The communication node comprising: a communication interface configured to receive instructions associated with transmitting a first announcement to a first user and a second announcement to a second user during a call between the first user and the second user, wherein the first announcement and the second announcement are different; a processor configured to instruct at least one node to transmit the first announcement to the first user and to transmit the second announcement to the second user, wherein the first announcement and the second announcement are played at a same time; the processor configured to monitor the transmission of the first announcement and the transmission of the second announcement, wherein one of the two announcements is a priority announcement and the other of the two announcements is a non-priority announcement; and the processor configured to instruct the at least one node to stop transmission of the non-priority announcement when the priority announcement is finished.

According to an embodiment, there is a computer-readable storage medium containing a computer-readable code that when read by a processor causes the processor to perform a method for announcement information comprising: generating a first announcement information associated with a first user; generating a second announcement information associated with a second user; and transmitting the first and second announcement information to a telephony application server, wherein the first announcement information and the second announcement information include at least one different element of data, further wherein both the first and second announcement information are used to generate or select announcements which are transmitted to the first and second users during a call between the first and second users.

According to an embodiment, there is an apparatus adapted to generate a first announcement information associated with a first user; to generate a second announcement information associated with a second user; and to transmit the first and second announcement information to a telephony application server, wherein the first announcement information and the second announcement information include at least one different element of data, further wherein both the first and second announcement information are used to generate or select announcement information which is transmitted to the first and second users during a call between the first and second users.

According to an embodiment, there is an apparatus comprising: a first module configured to generate a first announcement information associated with a first user; a second module configured to generate a second announcement information associated with a second user; and a third module configured to transmit the first and second announcement information to a telephony application server, wherein the first announcement information and the second announcement information include at least one different element of data, further wherein both the first and second announcement information are used to generate or select announcements which are transmitted to the first and second users during a call between the first and second users.

According to an embodiment, there is a computer-readable storage medium containing a computer-readable code that when read by a processor causes the processor to perform a method to control announcements to both a first user and a second user during a call between the first user and the second user, the method comprising: receiving instructions associated with transmitting a first announcement to a first user and a second announcement to a second user during a call between the first user and the second user, wherein the first announcement and the second announcement are different; instructing at least one node to transmit the first announcement to the first user and to transmit the second announcement to the second user, wherein the first announcement and the second announcement are played at a same time; monitoring the transmission of the first announcement and the transmission of the second announcement, wherein one of the two announcements is a priority announcement and the other of the two announcements is a non-priority announcement; and instructing the at least one node to stop transmission of the non-priority announcement when the priority announcement is finished.

According to an embodiment, there is an apparatus adapted to receive instructions associated with transmitting a first announcement to a first user and a second announcement to a second user during a call between the first user and the second user, wherein the first announcement and the second announcement are different; instruct at least one node to transmit the first announcement to the first user and to transmit the second announcement to the second user, wherein the first announcement and the second announcement are played at a same time; monitor the transmission of the first announcement and the transmission of the second announcement, wherein one of the two announcements is a priority announcement and the other of the two announcements is a non-priority announcement; and instruct the at least one node to stop transmission of the non-priority announcement when the priority announcement is finished.

According to an embodiment, there is an apparatus comprising: a first module configured to receive instructions associated with transmitting a first announcement to a first user and a second announcement to a second user during a call between the first user and the second user, wherein the first announcement and the second announcement are different; a second module configured to instruct at least one node to transmit the first announcement to the first user and to transmit the second announcement to the second user, wherein the first announcement and the second announcement are played at a same time; a third module configured to monitor the transmission of the first announcement and the transmission of the second announcement, wherein one of the two announcements is a priority announcement and the other of the two announcements is a non-priority announcement; and a fourth module configured to instruct the at least one node to stop transmission of the non-priority announcement when the priority announcement is finished.

According to an embodiment, there is a method for transmitting a first announcement to a first user on a call and a second announcement to a second user on the call, wherein the first announcement and the second announcement are different from one another, the method comprising: generating an Announcement-Data container Attribute Value Pair (AVP) including an Announcement-Information AVP and at least one of an announcement-priority AVP, a repeat-in-loop AVP and a play-alternative AVP; and transmitting the Announcement-Data container towards a server.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As described in the Background section, there are problems associated with mid-call announcements. Embodiments provide for more options with respect to mid-call announcements for both a served party and a non-served party involved in a Voice over Long Term Evolution (VoLTE) call, Video over LTE (ViLTE) call or any other call. Additionally, while embodiments described herein are described using LTE, other communication systems/networks could use and benefit from using such embodiments associated with mid-call announcements. Prior to describing various embodiments in detail, a brief overview of nodes and devices used for implementing the embodiments is now described with respect to FIG. 2.

Figure 2:
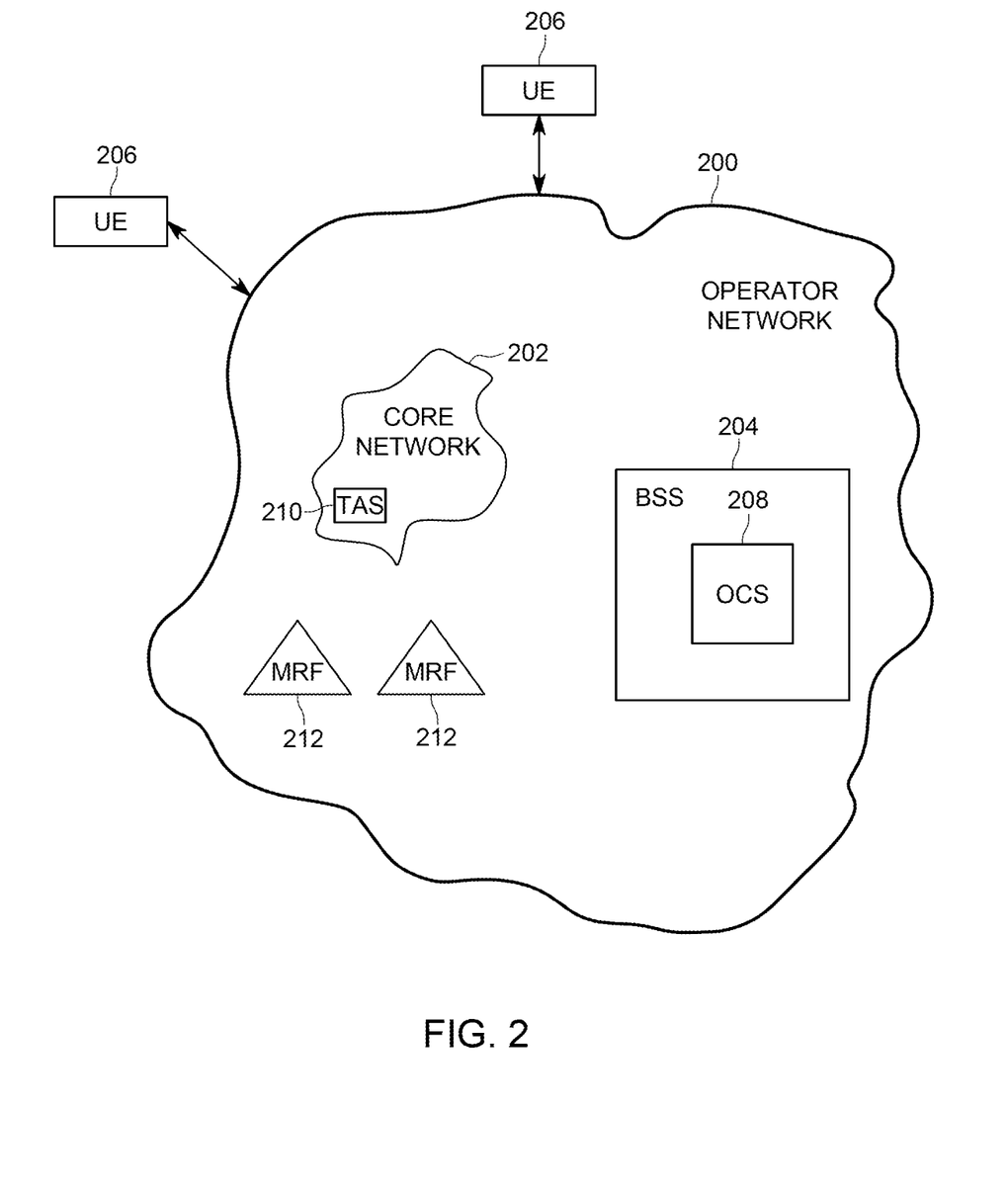
FIG. 2 shows an operator network according to an embodiment.

FIG. 2 shows an operator network 200 which includes a core network 202 and a business support system (BSS) 204, with various elements of the operator network 200 being in communications with various customers and subscribers via user equipments (UEs) 206. The UEs 206, or other devices capable of performing voice and/or video communications, are used by users and also represent at least one served party (which is a user that is a customer of the operator network) and another party which is also described herein as the non-served party (even though this user may or may not be a customer of the operator network). The BSS 204 includes the online charging system (OCS) 208 which is implemented on one or more nodes. The BSS 204 is a group of functions which can be spread out over a plurality of nodes to include, but not limited to, charging logic, routing logic, a subscriber database, and subscriber distribution controller(s) (SDC). The core network 202 represents the nodes in an operator's system that are responsible for interacting with the OCS 208 in the BSS 204, for requesting the units for consumption by the subscriber and for delivering services to end user devices. Additionally, the core network 202 includes a telephony application server (TAS) 210 which supports calls between users. Additionally, in the operator network 200, there are one or more media resource functions (MRFs) 212 which are used to store and transmit announcements when instructed.

According to an embodiment, systems and methods for mid-call announcements can be implemented in the OCS 208 and the TAS node 210 in the operator network 200. According to an embodiment, a method provides, in the OCS 208, the ability to generate, based on business logic and account status of the served party, announcement data for the specific announcement(s) to be played for the served party. The method then further determines, based on the business logic and the announcement data generated for the served party, the desired announcement to be played for the non-served party and generates the announcement data for the non-served party.

Based on the announcement data generated for the served party and the non-served party, the OCS 208 then provides this announcement information along with an indication on which party has priority to the TAS 210 so that the TAS 210 controls the play of different mid-call announcements at the same time to the served party and the non-served party that are involved in an ongoing VoLTE or ViLTE call. Note, that while the current example uses two parties, embodiments can also be performed using more than two parties, e.g., in a conference call. For calls with more than two parties, one announcement can be played for the served party, or the prioritized party, and another announcement played for the other parties on the call.

The TAS 210 based on the priority information provided by the OCS 208 monitors the announcement that is played on the priority leg, as denoted in the priority information provided by the OCS 208, e.g., to the served party, and then ensures that the announcement played on the non-priority leg, e.g., the non-served party, is looped if required, i.e., for the case in which the announcement played on the non-priority leg is shorter than the one played on the priority leg. If the announcement played on the non-priority leg is longer than the announcement played on the priority leg, then the TAS 210 interrupts the announcement on the non-priority leg to be able to resume or end the call between the two parties at a similar time.

Figure 3:
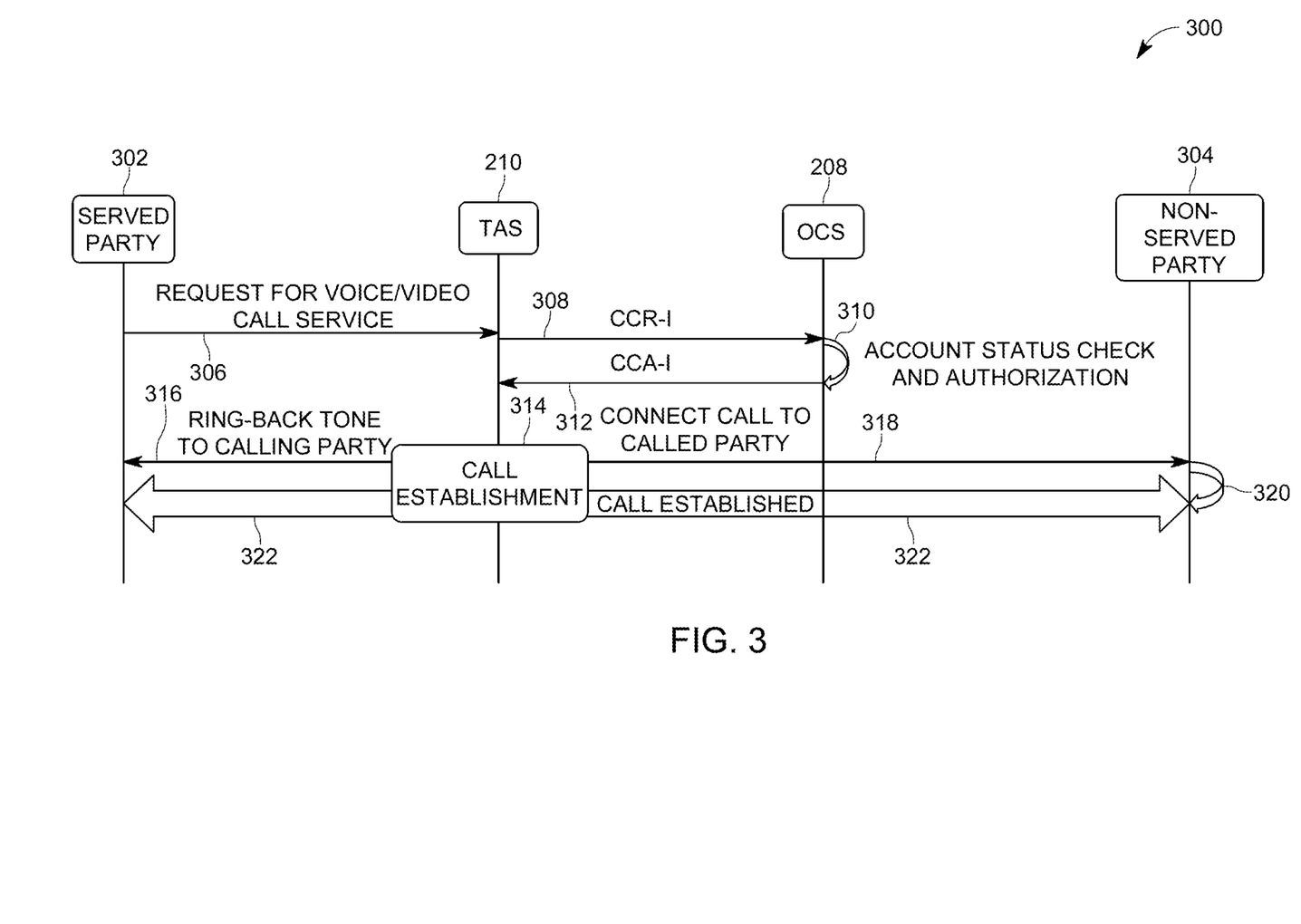
FIG. 3 illustrates establishing a call according to an embodiment.

Prior to mid-call announcements being triggered and played, a call needs to be established between the served party 302 and the non-served party 304 as shown in the signaling diagram 300 of FIG. 3. Initially, the served party 302 initiates and transmits a request for a voice or video call to the TAS 210 as shown in signal 306. The TAS 210 then transmits a Credit Control Request Initial (CCR-I) message 308 to the OCS 208 requesting availability of credit for the usage of the service. The OCS 208 then performs a subscriber's account status check, authorization check and uses a business logic configuration in step 310 to determine if the requested service units can be granted or if some other type of action should be taken.

In this example, the OCS 208, based on the decision of step 310, grants service usage units in the Credit Control Answer Initial (CCA-I) message 312 which is transmitted to the TAS 210. The TAS 210, based on received message 312, then performs the steps of call establishment 314 which includes the following steps: transmitting a ring-back tone to the serving party 302 in message 316; attempting (and in this example succeeding) to reach and connect the call to the non-served party 304 as shown in call 318; and when the call is answered by the non-served party in step 320, connecting the served party to the non-served party as shown by call established arrow 322.

Figure 4:
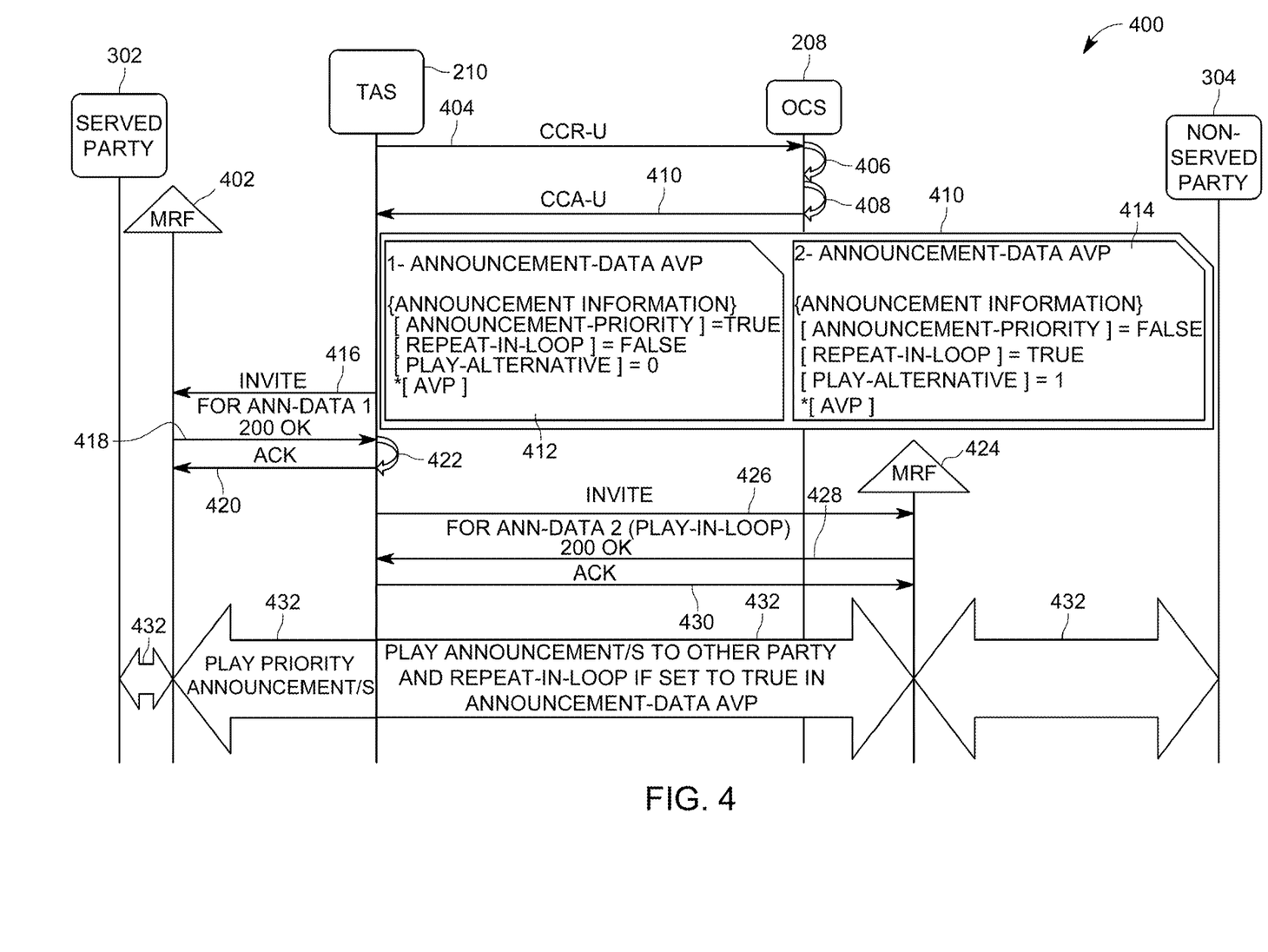
FIG. 4 depicts initiating mid-call announcements according to an embodiment.

According to an embodiment, generation of announcement data and playing different announcements to different parties simultaneously is now described with respect to the signaling diagram 400 of FIG. 4. In this example, a call is currently occurring between the served party 302 and the non-served party 306 and for which the call has a previously granted quota for resources. At some point in time, when either the validity time for the previously granted quota has expired or the granted quota has been exhausted, the TAS 210 transmits a credit control request update (CCR-U) message 404 to the OCS 208 to request new usage units. The OCS 208 determines that an announcement is to be played for the served party 302 and generates announcement data based on the subscriber's account status and business logic configuration in step 406. The OCS 208 then, based on the announcement data generated for the served party 302 and the business logic configuration, determines a different announcement to be played for the non-served party 304 and also generates the announcement data for the non-served party 304 in step 408.

The OCS 208 then sends the announcement data generated for both the served party 302 and the non-served party 304 in a credit control answer update (CCA-U) message 410 which is transmitted to the TAS 210. The CCA-U message 410 also includes a first Announcement-Data AVP 412 for the served party 302 and a second Announcement-Data AVP 414 for the non-served party 304. In addition to the announcement information, which is different for the two parties, an Announcement-Priority flag is set to true for one party and false for the other party, in this example true for the served party 302 and false for the non-served party 304. The Announcement-Priority AVP indicates whether a certain announcement, which could be for either the served party 302 or the non-served party 304, has priority, i.e., the goal is that the prioritized announcement must be completely played to the respective party, irrespective of whatever behavior is applied to the other party that is on the other end of the call. A Repeat-In-Loop flag is included to indicate whether the announcement is to be repeated, with true for repeat and false for not repeating the announcement. Also, a Play-Alternative AVP is included which can be used to indicate which party is to receive which message, e.g., 1 or 0 for served party 302 and non-served party 304, respectively. In other words, the Play-Alternative AVP indicates which party the specific announcement is meant to be played for.

The TAS 210 then transmits an invite message 416 to the MRF 402 for playing the announcement(s) associated with the first Announcement-Data AVP 412 for the served party 302. Messages 418 and 420 represent the 200 OK message from the MRF 402 to the TAS 210 and the corresponding ACK message. After receiving the 200 OK message 418 from the MRF 402, and as the announcement is indicated to be a priority announcement, in step 422, the TAS 210 monitors traffic to wait for a "BYE" response from the MRF 402 to indicate that all of the announcements are completely played to the served party 302.

In step 426, the OCS 208 via the TAS 210 interacts with another MRF 424 to play announcement(s) associated with the second Announcement-Data AVP 414. It is to be understood that while two MRFs 402 and 424 are shown here, it is also possible for only one MRF 402 or 424 to be used to play the announcements, but that the two different announcement legs are independent from each other and only monitored by the TAS 210. In this example, the TAS 210 also indicates to the MRF 424 that for the second Announcement-Data AVP 414, the announcement/s should be repeated in a loop. According to an embodiment, if there is only one announcement identifier, then only that announcement will be played in loop, if there are more than one announcement then these announcements will be played in a sequential loop, e.g., the 1st then 2nd then 3rd . . . then the Nth announcement then the 1st then 2nd then 3rd . . . and so on, until a "BYE" message is received from the MRF 402 at the TAS 210.

Messages 428 and 430 represent the 200 OK message from the MRF 424 to the TAS 210 and the corresponding ACK message. In step 432, the various arrows represent playing the different announcements to the served party 302 and the non-served party 304. After receiving the BYE message from the MRF 402 the announcement to the non-served party is terminated.

Figure 5:
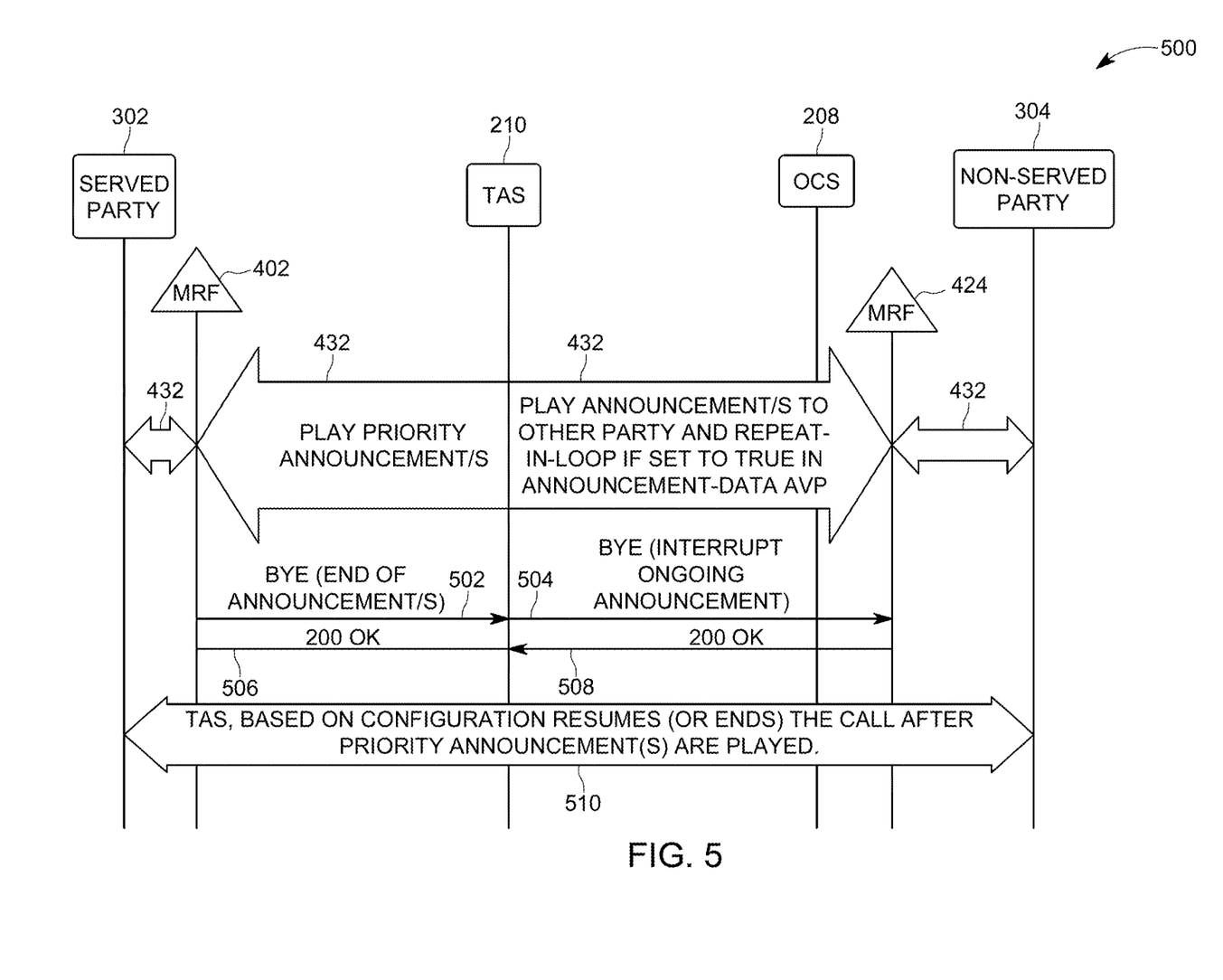
FIG. 5 shows ending mid-call announcements according to an embodiment.

According to an embodiment, FIG. 5 shows a signaling diagram 500 for resuming or ending the call after the priority announcement(s) are played. This example can be considered to be a continuation of the example shown in FIG. 4. In step 432, the various arrows represent playing the different announcements to the served party 302 and the non-served party 304. After the priority announcement is completely played, the MRF 402 informs the TAS 210 with the BYE message 502 which the TAS 210 acknowledges with 200 OK message 506. At this point it time, the TAS also transmits a BYE message 504 to MRF 424 to inform the MRF 424 to end the announcement(s) being played to the non-served party 304. The MRF 424 responds to the TAS 210 with the 200 OK message 508. As shown in step 510, the TAS, after announcement playing is completed for both the served party 302 and the non-served party 304, either resumes the call or ends the call depending upon the call scenario and business configuration.

As shown in FIG. 4, there is an Announcement-Data Attribute Value Pair (AVP) transmitted from the OCS 208 to the TAS 210. This Announcement-Data AVP described herein is a new grouped AVP which acts a container AVP for the currently existing, but now modified, Announcement-Information AVP and other new AVPs as is now described.

Examples of the Announcement-Data AVP, according to an embodiment, can be seen in Announcement-Data AVPs 412 and 414, the format for which is shown below.

```
Announcement-Data:: = <AVP Header: xxxx>
    {Announcement-Information}
    [Announcement-Priority]
    [Repeat-In-Loop]
    [Play-Alternative = y]
    *[AVP]
``` with xxxx expected to represent, for example, a four-digit number and y being either a 0 or a 1 for yes or no.

According to an embodiment, the Announcement-Priority AVP indicates whether the announcement(s) to be played for a certain party in the call has priority or not, i.e., whether the announcement should be completely played for the user or not. The Repeat-In-Loop AVP indicates whether the announcement or the sequence of announcements that are identified for a certain party in the call should be played in a loop or not. The Play-Alternative AVP is an existing AVP which conventionally is specified to be within the Announcement-Information AVP, however, according to an embodiment, the Play-Alternative AVP is located within the Announcement-Data AVP.

Additionally, there is a Multiple Service Credit Control (MSCC) AVP which can be a part of the CCR and CCA messages. The MSCC AVP is currently specified in the RFC 4006 (Diameter Credit-Control Application) specification with an AVP code of 456. 3GPP TS 32.299 also adds charging parameter to the MSCC AVP, one of which is the Announcement-Information AVP. This can be repeated multiple times to carry Announcement-Data for different parties.

A more specific example of the Announcement-Data AVP described above for this embodiment (but with exemplary values) is shown below.

```
Announcement-Data [xxxx:xxxxx]
    Announcement-Information [3904:xxxxx]
    Announcement-Priority [xxxx:xxxxx] {True}
    Repeat-In-Loop [xxxx:xxxxx] {False}
    Play-Alternative [3913:xxxxx] {1} {1 = served party}
```

According to an embodiment, a modified Announcement-Information AVP which can be included in the container Announcement-Data AVP above is described herein. An example of the format for the modified Announcement-Information AVP is shown below.

```
Announcement-Information: := <AVP Header: 3904>
    {Announcement-Identifier}
    *[Variable-Part]
    [Time-Indicator]
    [Quota-Indicator]
    [Announcement-Order]
    [Privacy-Indicator]
    [Language]
```

According to an embodiment, the Play-Alternative AVP is moved from the Announcement-Identifier AVP to the container Announcement-Data AVP. Additionally, not all fields are required to be used. An example of the Announcement-Information AVP is shown below.

```
Announcement-Information [3904:xxxxx]
    Announcement-Identifier [3905:xxxxx] {6012}
    Announcement-Order [3906:xxxxx] {1}
    Variable-Part [3907:xxxxx]
    Variable-Part-Order [3908:xxxxx] {1}
    Variable-Part-Type [3909:xxxxx] {4}
    Variable-Part-Value [3910:xxxxx] {00024000}
```

Figure 6:
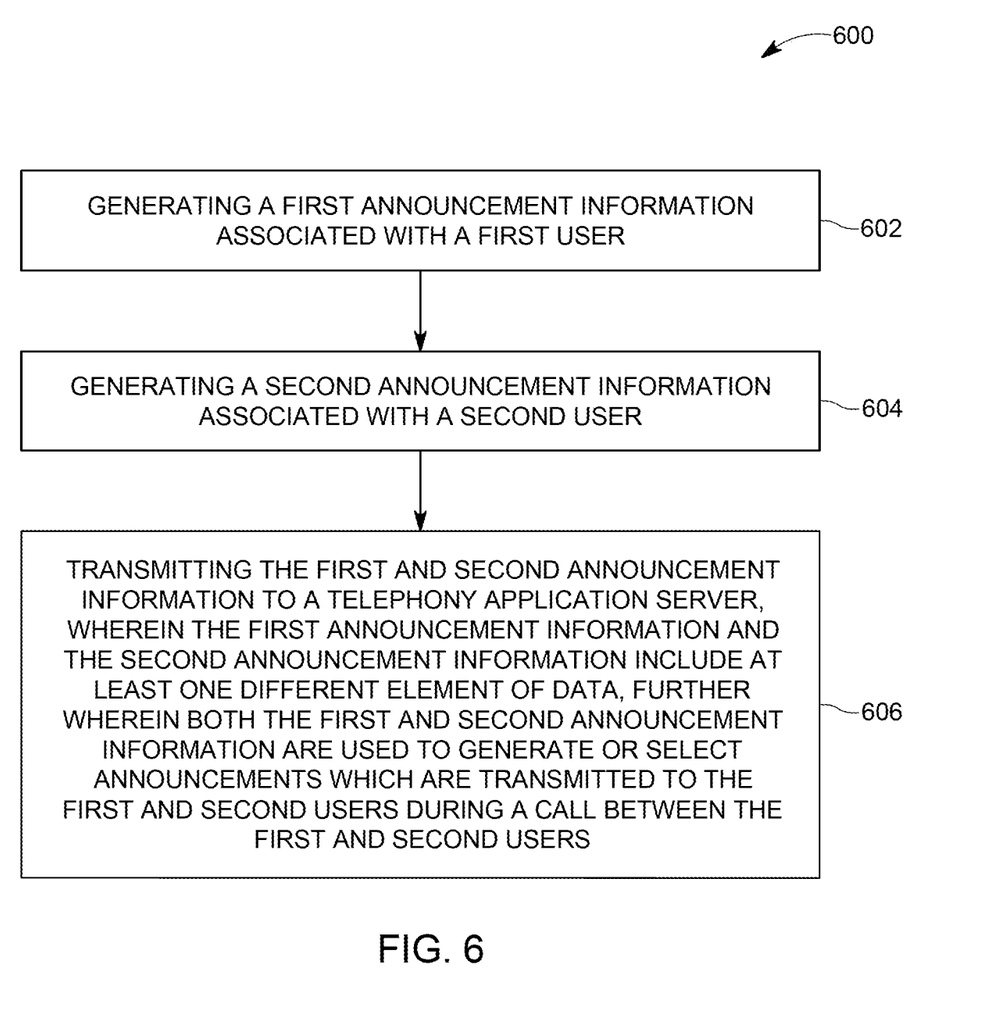
FIG. 6 shows a flowchart of a method for generating announcement information according to an embodiment.

According to an embodiment, there is a method 600 for generating announcement information at a communication node as shown in FIG. 6. The method includes: in step 602, generating a first announcement information associated with a first user; and in step 604, generating a second announcement information associated with a second user; and in step 606, transmitting the first and second announcement information to a telephony application server, wherein the first announcement information and the second announcement information include at least one different element of data, further wherein both the first and second announcement information are used to generate or select announcements which are transmitted to the first and second users during a call between the first and second users.

Figure 7:
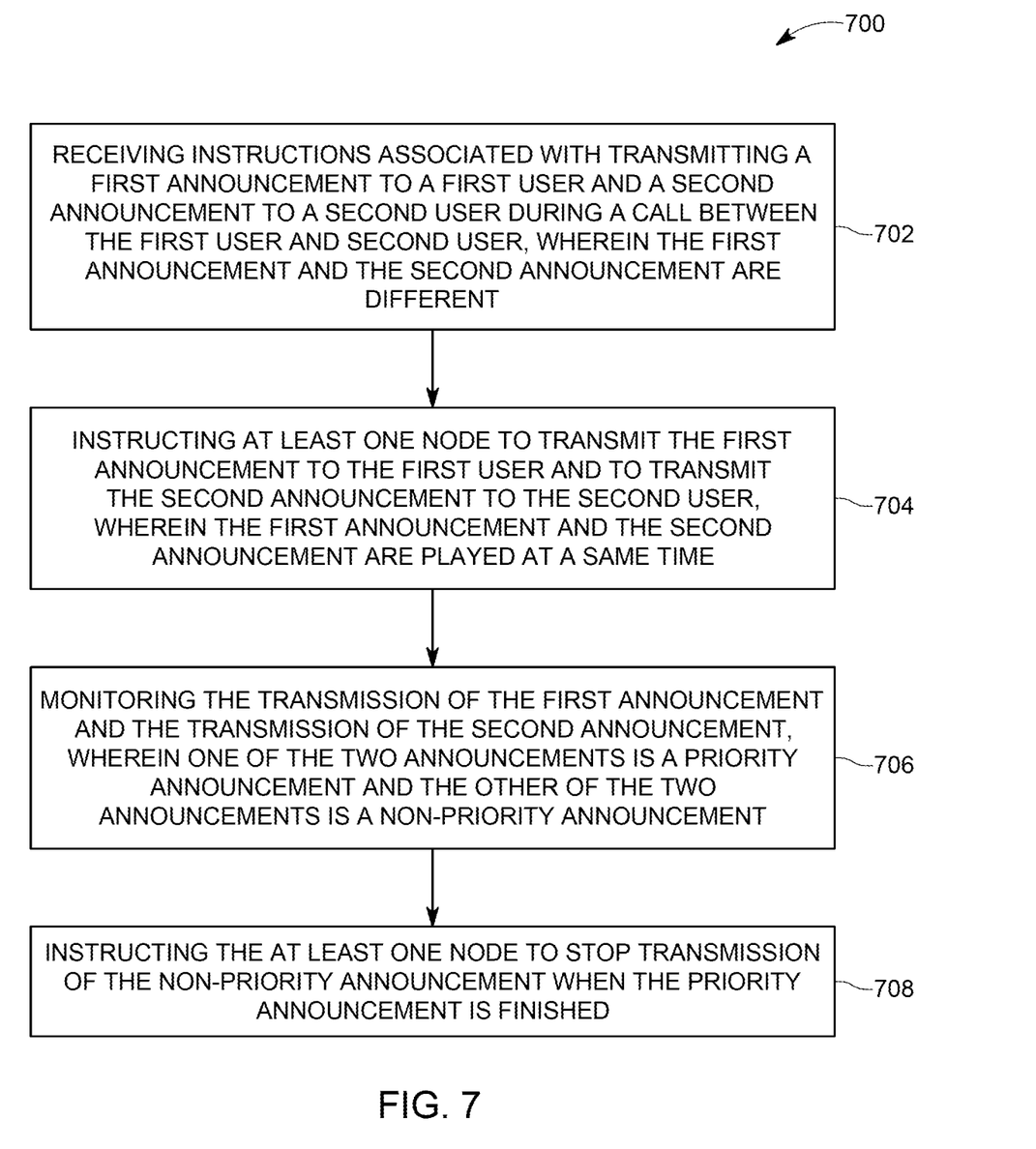
FIG. 7 shows a flowchart of a method for controlling announcements according to an embodiment.

According to an embodiment, there is a method 700 for controlling announcements to both a first user and a second user during a call between the first user and the second user, wherein the controlling is performed by a communication node, as shown in FIG. 7. The method includes: in step 702, receiving instructions associated with transmitting a first announcement to a first user and a second announcement to a second user during a call between the first user and the second user, wherein the first announcement and the second announcement are different; in step 704, instructing at least one node to transmit the first announcement to the first user and to transmit the second announcement to the second user, wherein the first announcement and the second announcement are played at a same time; in step 706, monitoring the transmission of the first announcement and the transmission of the second announcement, wherein one of the two announcements is a priority announcement and the other of the two announcements is a non-priority announcement; and in step 708, instructing the at least one node to stop transmission of the non-priority announcement when the priority announcement is finished.

Figure 8:
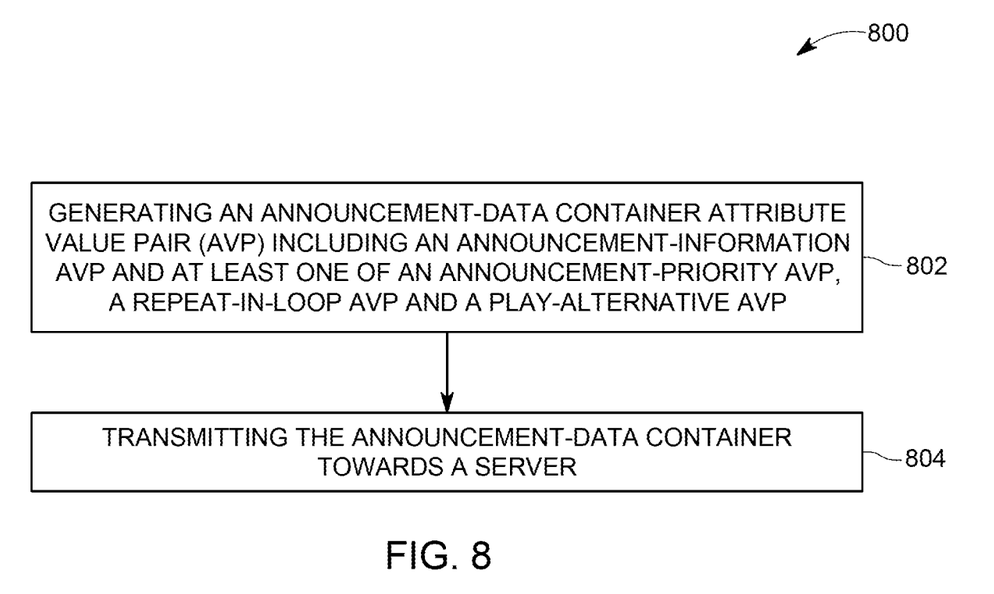
FIG. 8 illustrates a flowchart of a method for transmitting a first announcement to a first user and a second announcement to a second user according to an embodiment.

According to an embodiment, there is a method 800 for transmitting a first announcement to a first user on a call and a second announcement to a second user on the call, wherein the first announcement and the second announcement are different from one another as shown in FIG. 8. The method includes: in step 802, generating an Announcement-Data container Attribute Value Pair (AVP) including an Announcement-Information AVP and at least one of an announcement-priority AVP, a repeat-in-loop AVP and a play-alternative AVP; and in step 804, transmitting the Announcement-Data container towards a server.

Embodiments provide various advantages or improvements for mid-call announcements in a VoLTE or ViLTE call. For example, embodiments provide the ability to play different announcements to both the served party and the non-served party at the same time. This improves the end-user experience by providing the ability to play announcements that are relevant to each party. The embodiments also allow the operator, of the network, an opportunity to play advertisements to one party while the other party is being played some other announcement. Additionally, embodiments allow the operator an opportunity to provide sponsored services to their users by playing paid advertisements as announcements during an ongoing call. Alternatively, the announcement can be a message describing the need to replenish the credit in a user's account or selected based on the business logic, e.g., based on a user's phone number. According to another embodiment, announcements can have either a fixed time length or variable time lengths.

Figure 9:
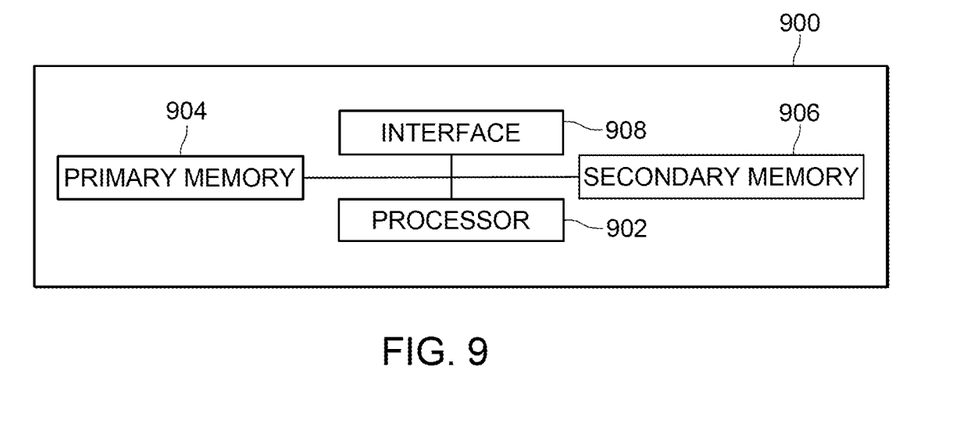
FIG. 9 depicts a communication node according to an embodiment.

Embodiments described above can be implemented in one or more nodes (or servers). An example of a communication node 900 is shown in FIG. 9. The communication node 900 (or other network node) includes a processor 902 for executing instructions and performing the functions described herein, e.g., the functions performed by the TAS 210 and the OCS 208. The communication node 900 also includes a primary memory 904, e.g., random access memory (RAM) memory, a secondary memory 906 which can be a non-volatile memory, and an interface 908 for communicating with other portions of a network or among various nodes/servers in support of mid-call announcements.

Processor 902 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other communication node 900 components, such as memory 904 and/or 906, server 900 functionality. For example, processor 902 may execute instructions stored in memory 904 and/or 906.

Primary memory 904 and secondary memory 906 may comprise any form of volatile or non-volatile computer readable memory including, without limitation, persistent storage, solid state memory, remotely mounted memory, magnetic media, optical media, RAM, read-only memory (ROM), removable media, or any other suitable local or remote memory component. Primary memory 904 and secondary memory 906 may store any suitable instructions, data or information, including software and encoded logic, utilized by node 900. Primary memory 904 and secondary memory 906 may be used to store any calculations made by processor 902 and/or any data received via interface 908.

Communication node 900 also includes interface 908 which may be used in the wired or wireless communication of signaling and/or data. For example, interface 908 may perform any formatting, coding, or translating that may be needed to allow communication node 900 to send and receive data over a wired connection. Interface 908 may also include a radio transmitter and/or receiver that may be coupled to or a part of the antenna. The radio may receive digital data that is to be sent out to other network nodes or wireless devices via a wireless connection. The radio may convert the digital data into a radio signal having the appropriate channel and bandwidth parameters. The radio signal may then be transmitted via an antenna to the appropriate recipient.

Various embodiments described herein refer in some fashion to nodes, e.g., node which supports the OCS 208. In some embodiments the non-limiting communication node (also interchangeably called as node) is more commonly used and it refers to any type of network node which directly or indirectly communicates with a UE, a node in the operator network 200, the core network 202 and the OCS 208. It can be radio network node or a node in the core network 202, e.g., the TAS 210, or fixed part of the network such as the OCS 208.

According to embodiments, the systems and methods described herein can generate and play different mid-call announcements in an ongoing VoLTE and/or ViLTE calls along with the ability to add a priority flag for a certain announcement leg. Embodiments allow for the operator to provide sponsored VoLTE and/or ViLTE services by playing paid advertisements to the parties (users/subscribers) involved in the call. This can allow for the operator to have an opportunity to attract more subscribers from their competitors by playing targeted mid-call announcements to the non-served party which may subscribe to another telecommunication operator. Additionally, embodiments provide the ability to enhance the end-user experience by playing relevant announcements, providing information to each party involved in the call and by not putting one party in the call on hold while mid-call announcements are played to the other party.

The disclosed embodiments provide methods and devices for performing mid-call announcements. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

Figure 10:
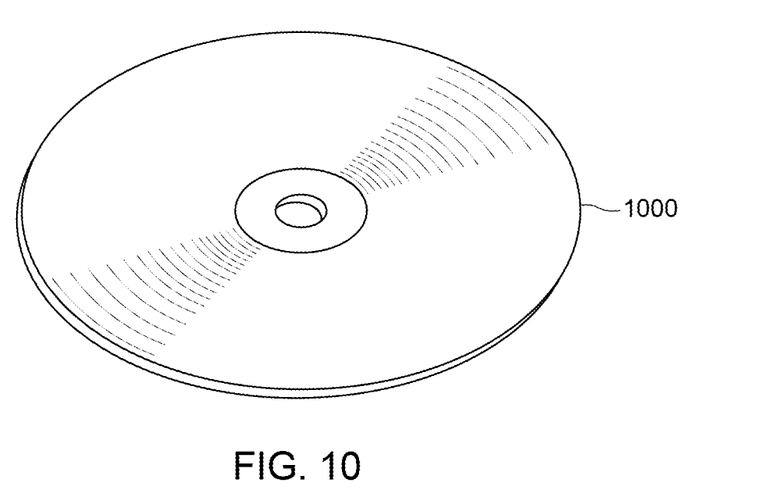
FIG. 10 depicts an electronic storage medium on which computer program embodiments can be stored.

As also will be appreciated by one skilled in the art, the embodiments may take the form of an entirely hardware embodiment or an embodiment combining hardware and software aspects. Further, the embodiments, e.g., the configurations and other logic associated with the mid-call announcement process to include embodiments described herein, such as, the methods associated with FIGS. 6-8, may take the form of a computer program product stored on a computer-readable storage medium having computer-readable instructions embodied in the medium. For example, FIG. 10 depicts an electronic storage medium 1000 on which computer program embodiments can be stored. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method for generating announcement information at a communication node, the method comprising:
    generating a first announcement information associated with a first user;
    generating a second announcement information associated with a second user; and
    transmitting the first and second announcement information to a telephony application server, wherein the first announcement information and the second announcement information include at least one different element of data, further wherein both the first and second announcement information are used to generate or select announcements which are transmitted to the first and second users during a call between the first and second users after the second user answers the call from the first user, wherein the call is connected and established between the first and second users, further wherein the first and second announcement information include an announcement data attribute value pair (AVP) which includes the fields of announcement-information AVP, announcement-priority AVP, and repeat-in-loop AVP.

2. The method of claim 1, wherein generating the first announcement information is performed using at least business logic and account information associated with the first user and generating the second announcement information is performed using at least business logic and account information associated with the second user.

3. A computer program stored on a non-transitory computer-readable medium, comprising instructions which, when executed on at least one processor, cause the at least one processor to carry out the method according to claim 1.

4. A method for controlling announcements to both a first user and a second user during a call between the first user and the second user, wherein the controlling is performed by a communication node, the method comprising:
    receiving instructions associated with transmitting a first announcement to a first user and a second announcement to a second user during a call between the first user and the second user after the second user answers the call from the first user, wherein the call is connected and established between the first and second users, wherein the first announcement and the second announcement are different;
    instructing at least one node to transmit the first announcement to the first user and to transmit the second announcement to the second user, wherein the first announcement and the second announcement are played at a same time;
    monitoring the transmission of the first announcement and the transmission of the second announcement, wherein one of the two announcements is a priority announcement and the other of the two announcements is a non-priority announcement; and
    instructing the at least one node to stop transmission of the non-priority announcement when the priority announcement is finished.

5. The method of claim 4, wherein the non-priority announcement is a message which repeats in a loop when a repeat-in-loop attribute value pair (AVP) is set to true in the received instructions.

6. The method of claim 4, wherein the at least one node is a media resource function node configured to transmit video and audio announcements.

7. The method of claim 4, wherein the communication node is a telephony application server.

8. A communication node configured to control announcements to both a first user and a second user during a call between the first user and the second user, the communication node comprising:
    a communication interface configured to receive instructions associated with transmitting a first announcement to a first user and a second announcement to a second user during a call between the first user and the second user after the second user answers the call from the first user, wherein the call is connected and established between the first and second users, wherein the first announcement and the second announcement are different;
    a processor configured to instruct at least one node to transmit the first announcement to the first user and to transmit the second announcement to the second user, wherein the first announcement and the second announcement are played at a same time;
    the processor configured to monitor the transmission of the first announcement and the transmission of the second announcement, wherein one of the two announcements is a priority announcement and the other of the two announcements is a non-priority announcement; and
    the processor configured to instruct the at least one node to stop transmission of the non-priority announcement when the priority announcement is finished.

9. The communication node of claim 8, wherein the non-priority announcement is a message which repeats in a loop when a repeat-in-loop attribute value pair (AVP) is set to true in the received instructions.

10. The communication node of claim 8, wherein the at least one node is a media resource function node configured to transmit video and audio announcements.

11. The communication node of claim 8, wherein the communication node is a telephony application server.

12. A communication node for generating announcement information, the communication node comprising:
- a processor configured to generate a first announcement information associated with a first user;
- the processor configured to generate a second announcement information associated with a second user; and
- a communication interface configured to transmit the first and second announcement information to a telephony application server, wherein the first announcement information and the second announcement information include at least one different element of data, further wherein both the first and second announcement information are used to generate or select announcements which are transmitted to the first and second users during a call between the first and second users after the second user answers the call from the first user, wherein the call is connected and established between the first and second users, further wherein the first and second announcement information include an announcement data attribute value pair (AVP) which includes the fields of announcement-information AVP, announcement-priority AVP, and repeat-in-loop AVP.

* * * * *